(12) United States Patent
Randall et al.

(10) Patent No.: US 12,177,179 B2
(45) Date of Patent: *Dec. 24, 2024

(54) SYSTEMS AND METHODS FOR PRIORITIZING MESSAGES

(71) Applicant: Capital One Services, LLC, McLean, VA (US)

(72) Inventors: Garrett Randall, Kitchener (CA); Elijah Moreau-Arnott, Guleph (CA); Jonathan Shek Wing Lee, Richmond Hill (CA)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/542,565

(22) Filed: Dec. 15, 2023

(65) Prior Publication Data

US 2024/0275753 A1 Aug. 15, 2024

Related U.S. Application Data

(63) Continuation of application No. 18/169,804, filed on Feb. 15, 2023, now Pat. No. 11,863,511.

(51) Int. Cl.
*H04L 51/226* (2022.01)
*G06F 16/2457* (2019.01)

(52) U.S. Cl.
CPC ...... *H04L 51/226* (2022.05); *G06F 16/24578* (2019.01)

(58) Field of Classification Search
CPC ..... H04L 51/226; H04L 51/212; H04L 51/26; H04L 51/24; G06F 16/24578; G08B 21/24
See application file for complete search history.

(56) References Cited

U.S. PATENT DOCUMENTS

| 7,756,535 | B1 | 7/2010 | Diao et al. |
| 7,961,853 | B2 | 6/2011 | Voticky |
| 8,056,128 | B1* | 11/2011 | Dingle .................... G06F 16/35 726/22 |
| 9,002,963 | B2 | 4/2015 | Gross et al. |
| 9,159,057 | B2 | 10/2015 | Monaco |
| 9,929,997 | B2 | 3/2018 | Karuppasamy |
| 10,212,119 | B2 | 2/2019 | Bisarya et al. |
| 10,511,560 | B2 | 12/2019 | Kursun et al. |
| 10,699,276 | B1* | 6/2020 | Smith ................ G06Q 20/4014 |

(Continued)

FOREIGN PATENT DOCUMENTS

KR 2017044075 A 4/2017

*Primary Examiner* — Sargon N Nano
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method for prioritizing messages. The system may include receiving one or more messages comprising message data and application sender data. From the message data and application sender data, the system may determine a ranking of importance of the one or more messages, and then determine whether a first message is urgent. If the first message is urgent, the system may send the first message to the user device. If the first message is not urgent, the system may determine a set time for the first message to be sent and send the first message to the user device at the set time.

20 Claims, 5 Drawing Sheets

(56) References Cited

U.S. PATENT DOCUMENTS

| | | | |
|---|---|---|---|
| 11,005,802 B1* | 5/2021 | Candelore | H04L 51/212 |
| 11,379,855 B1* | 7/2022 | Anderson | G06N 20/00 |
| 11,606,323 B2 | 3/2023 | Chowdhury et al. | |
| 11,895,264 B2* | 2/2024 | Phatak | H04M 3/2281 |
| 2003/0097320 A1* | 5/2003 | Gordon | G06Q 40/00 |
| | | | 707/E17.058 |
| 2005/0160280 A1 | 7/2005 | Caslin et al. | |
| 2005/0249341 A1* | 11/2005 | Mahone | H04L 67/535 |
| | | | 713/189 |
| 2005/0278550 A1* | 12/2005 | Mahone | H04M 15/47 |
| | | | 713/189 |
| 2006/0287876 A1 | 12/2006 | Jedlicka | |
| 2009/0016499 A1 | 1/2009 | Hullfish et al. | |
| 2017/0034103 A1 | 2/2017 | Karuppasamy | |
| 2017/0201481 A1 | 7/2017 | Bisarya et al. | |
| 2017/0222956 A1 | 8/2017 | Jain et al. | |
| 2022/0351207 A1* | 11/2022 | Hobbs | G06Q 30/0283 |
| 2024/0193411 A1* | 6/2024 | Navratil | G06N 3/045 |

* cited by examiner

SYSTEMS AND METHODS FOR PRIORITIZING MESSAGES

CROSS-REFERENCE TO RELATED APPLICATIONS

This application is a continuation of, and claims priority under 35 U.S.C. § 120 to, U.S. patent application Ser. No. 18/169,804, filed Feb. 15, 2023, the entire contents of which are fully incorporated herein by reference.

FIELD

The disclosed technology relates to systems and methods for prioritizing messages. Specifically, this disclosed technology relates to determining which messages of a group of messages are more important than others, ranking the messages accordingly, and sending the messages, in part, based on the ranking.

BACKGROUND

Users get a variety of messages from companies on a daily basis. For example, from a bank, a user may get messages related to marketing, configurable or usage alerts, and fraud alerts. Occasionally, a single event will cause the user to get multiple alerts. For example, if a user uses a credit card in a foreign country, they may receive an informational message regarding exchange rates, a configured message notifying them of a charge over $50, and a fraud message about an unexpected charge in a foreign country. This can be distracting or irritating to the user, who may disregard the messages if they receive too many at one time.

SUMMARY

Disclosed embodiments may include a system for prioritizing messages. The system may include one or more processors, and memory in communication with the one or more processors and storing instructions that, when executed by the one or more processors, are configured to cause the system to prioritize messages. The system may receive, from one or more applications, one or more messages to be sent to a user, each message of the one or more messages comprising message data and application sender data. The system may also determine a ranking of importance of the one or more messages using the message data and the application sender data. Additionally, the system may determine, using a first machine learning model, whether a first message of the one or more messages is urgent based on the ranking of importance. In response to determining the first message is urgent, the system may send the first message to the user device. In response to determining the first message is not urgent, the system may determine a set time for the first message to be sent and send the first message to the user device at the set time.

Disclosed embodiments may include a system for prioritizing messages. The system may include one or more processors, and memory in communication with the one or more processors and storing instructions that, when executed by the one or more processors, are configured to cause the system to prioritize messages. The system may receive, from one or more applications, one or more messages to be sent to a user, each message of the one or more messages comprising message data and application sender data. The system may also determine a ranking of importance of the one or more messages using the message data and the application sender data. Furthermore, the system may determine, using a first machine learning model, whether a first message of the one or more messages is urgent based on the ranking of importance. In response to determining the first message is urgent, the system may send the first message to a user device. In response to determining the first message is not urgent, the system may determine a set time for the first message to be sent and at the set time, determine, using a second machine learning model whether the first message is appropriate to send based on the message data and the application sender data. In response to determining that the first message is appropriate to send, the system may send the first message to the user device, and in response to determining that the first message is not appropriate to send delete the first message.

Disclosed embodiments may include a system for prioritizing messages. The system may include one or more processors, and memory in communication with the one or more processors and storing instructions that, when executed by the one or more processors, are configured to cause the system to prioritize messages. The system may receive, from one or more applications, one or more messages to be sent to a user, each message of the one or more messages comprising message data and application sender data. The system may also determine a ranking of importance of the one or more messages using the message data and the application sender data. Furthermore, the system may determine, using a first machine learning model, whether a first message of the one or more messages is urgent based on the ranking of importance. In response to determining the first message is urgent, the system may send the first message to the user device. In response to determining the first message is not urgent, the system may determine a set time for the first message to be sent, at the set time, combine, using a second machine learning model, the first message and other messages of the one or more messages to create a combined message, and send the combined message to the user device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
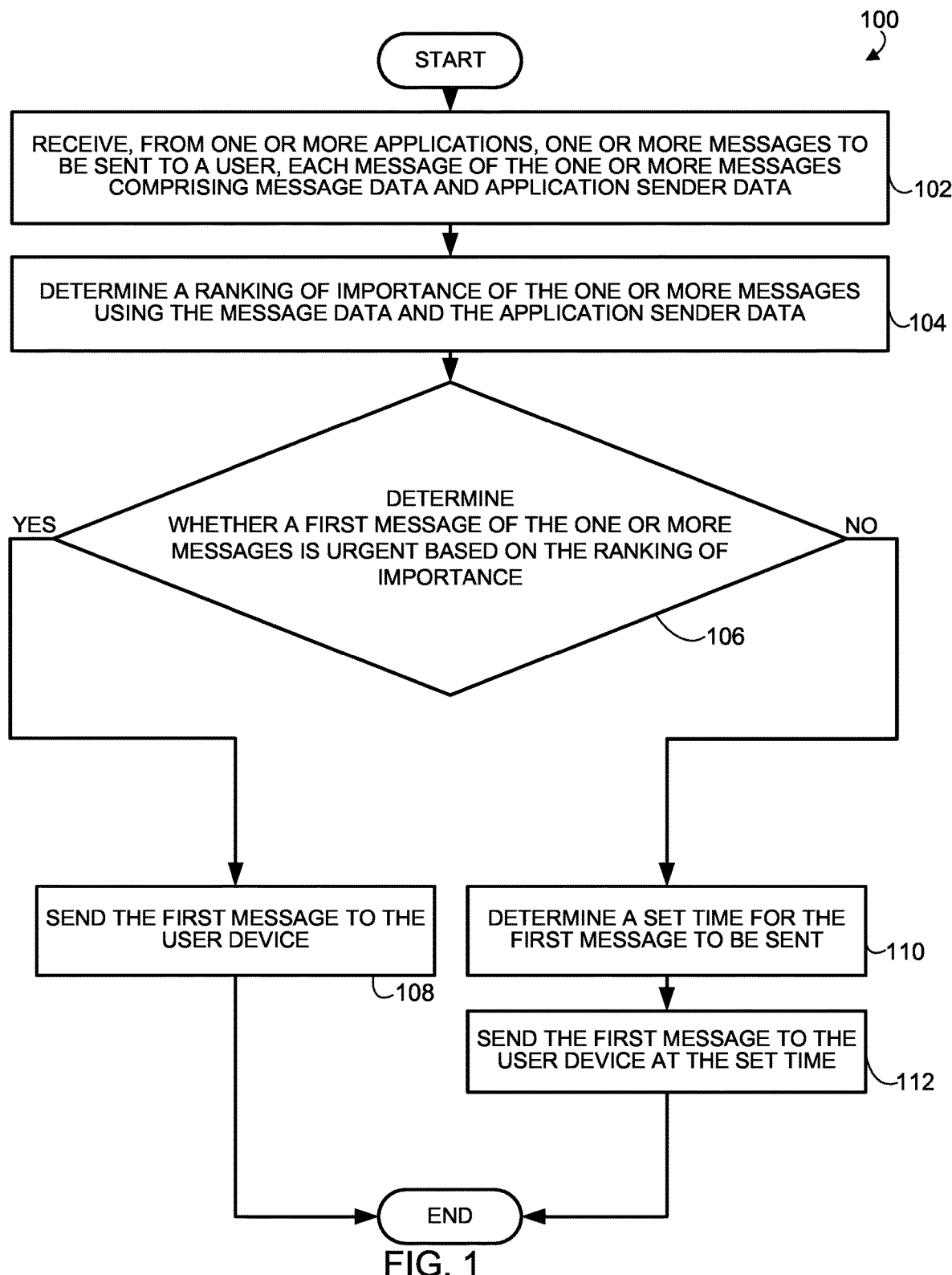
FIG. 1 is a flow diagram illustrating an exemplary method for prioritizing messages in accordance with certain embodiments of the disclosed technology.

Traditional systems and methods for prioritizing messages focus on throttling outgoing messages from senders, based on what messages customers have recently received. These systems generally effect only truly optional messages, such as marketing messages, and may not affect messages that users have opted-into receiving. This greatly decreases the effectiveness of the system, because only truly optional messages can be delayed, not every type of message.

Accordingly, there is a need for improved systems and methods for prioritizing messages. Embodiments of the present disclosure are directed to this and other considerations.

Examples of the present disclosure related to systems and methods for prioritizing messages. More particularly, the disclosed technology relates to assessing the importance of an assortment of messages and ranking the messages in order of importance or urgency. The systems and methods described herein utilize, in some instances, machine learning models, which are necessarily rooted in computers and technology. Machine learning models are a unique computer technology that involves training models to complete tasks and make decisions. The present disclosure details determining which messages of a group of messages are urgent. This, in some examples, may involve using message and application sender input data and one or more machine learning models, applied to determine the ranking of importance of one or more messages or determine if a message is urgent. Using a machine learning model in this way may allow the system to prioritize which messages need to be sent immediately and which messages can be delayed. Additionally, other machine learning models may be able to combine two or more messages into a single message. These are clear advantages and improvements over prior technologies that send an assortment of unranked messages to users all at once because users may ignore messages when multiple messages come at one time. This is also an improvement over systems that throttle messages based on what a customer has recently received because those systems only consider certain types of messages. The present disclosure solves this problem by sending the most important messages first and storing and sending less important messages at a later time.

Furthermore, the systems and methods described herein utilize, in some instances, graphical user interfaces, which are necessarily rooted in computers and technology. Graphical user interfaces are a computer technology that allows for user interaction with computers through touch, pointing devices, or other means. This, in some examples, may involve using user inputs from a user to dynamically change the graphical user interface by influencing how the user receives messages. Using a graphical user interface in this way may allow the system to change how messages are delivered to the user based on user preferences. Additionally, examples of the present disclosure may also improve network usage by preventing spikes in computer resource load by sending out large numbers of messages to users at one time when some messages could be sent out periodically. Overall, the systems and methods disclosed have significant practical applications in the notification field because of the noteworthy improvements of the message prioritization system, which is important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for prioritizing messages, in accordance with certain embodiments of the disclosed technology. The steps of method 100 may be performed by one or more components of the system 400 (e.g., message prioritization system 320 or web server 410 of user messaging system 408 or user device 402), as described in more detail with respect to FIGS. 3 and 4.

In block 102, the message prioritization system 320 may receive one or more messages to be sent to a user. Messages may be email messages, short message service (SMS) messages, push notifications, instant messages, application notifications (e.g., a newsfeed or message inbox from within an application), or any other form of messaging-type communication commonly sent to, and read by, users. The messages may be received from one or more applications. Each message may contain message data (e.g., the text of the message) and application sender data (e.g., which application the message is from). The message data may include the details to be sent to the user to read (e.g., "Your card was just used in an online transaction in Bulgaria. Was this you?"). The application sender data may include information or details about the application sending the message or be a subject (e.g., "Fraud system," "Fraud alert," or "Fraud") and timing data (e.g., when the message was sent and/or when a relevant event occurred). The message prioritization system 320 may receive several messages at one time or in quick succession.

In block 104, the message prioritization system 320 may determine a ranking of importance of the one or more messages using the message data and the application sender data. The ranking of importance may act as a queue or buffer for messages that need to be sent out to users. The message prioritization system 320 may accumulate and order the messages over time in the queue. The ordering of the ranking of importance may be based on tiers. The tiers may include a first tier containing messages that require immediate action by the customer to mitigate financial loss or substantially increase customer experience (e.g., fraud or security messages), a second tier containing messages related to configured messages (e.g., user selected alerts), and a third tier containing messages related to informational and/or marketing messages. Fraud messages may be messages corresponding to account concerns where the user's account may have been compromised. User-configured messages may be messages that the user has configured to receive from the business (e.g., if a user has requested to receive messages stating when any charge for more than $50 appears on their credit card account). Marketing messages may be non-essential messages, advertisements, or general account information. The message prioritization system 320 may give urgent messages, such as fraud messages, in a higher tier (e.g., placing messages at the front of the queue). However, the message prioritization system 320 may give less urgent messages, such as marketing messages, in a lower tier (e.g., placing messages at the back of the queue).

As messages come into the message prioritization system 320, the system constantly reviews and ranks the messages by priority. The message prioritization system 320 may rank messages specific to a single user. The message prioritization system 320 may dynamically review messages, or may review messages at fixed intervals (e.g., every 30 seconds or every minute). The fixed interval may be set by known information about the user, such as how often the user checks their email. Message prioritization system 320 may use a first machine learning model to determine the ranking of each message on the ranking of importance. The message prioritization system 320 may use the message data, application data, and timing data in order to determine the ranking of each message. The first machine learning model of message prioritization system 320 may be trained based on data of prior messages for the same user or for other users. The first machine learning model of message prioritization system 320 may also be trained through feedback to recognize messages that are known to occur in conjunction with other messages (e.g., when travelling outside the country, the user would typically receive a fraud alert, a transaction alert, and a notification about exchange rates) and known user preferences for the user. The known user preferences for the user may come from a user account. The message prioritization system 320 may use a tiered rules-based approach for decisioning. The message prioritization system 320 may modify results at a user-by-user level to achieve the best results for individual users.

The message prioritization system 320 machine learning model may consider several key factors when ranking messages. First, the message prioritization system 320 may consider what application (or part of the business) the message is coming from, as certain business divisions tend to present messages for more important reasons than others. Second, the message prioritization system 320 may consider timeliness. The message may have a limited time frame for the user to act. For example, if one message is supposed to remind the user of a technician that is supposed to arrive for a service call at their house in 5 minutes, that particular message is going to be more important than other, less time-critical messages. Third, the message prioritization system 320 may consider user preferences. If user preference data is available, and there is an indication on how the user may respond to a message, the message prioritization system 320 may factor this into when sending messages is appropriate. For example, if a message comes from an application in the middle of the night that is not necessary to send immediately, the message prioritization system 320 may rank the message lower than other messages.

The message prioritization system 320 may rank the messages in a constant or static fashion over time. The message prioritization system 320 may change the ranking for a message depending on how long the message has been in the queue. In the above example, message prioritization system 320 may rank a message originally received by the message prioritization system 320 from an application in the middle of the night as low so that the user is not woken up; however, the message prioritization system 320 may re-rank the same message as high, because the message is important enough that the user needs to address the message immediately when they wake up. The message prioritization system 320 may store messages in the queue for a variety of time lengths depending on the importance.

In block 106, the message prioritization system 320 may determine whether a message of the one or messages is urgent based on the ranking of importance. Once the message prioritization system 320 sorts the messages into their various rankings, the message prioritization system 320 may determine if each of the messages in the ranking is urgent, based on the ranking (e.g., a fraud message would have a higher ranking, and therefore, be more urgent than a marketing message). If the message prioritization system 320 ranks the message at the highest ranking (e.g., 1 out of 10), the message prioritization system 320 may determine that the message is urgent and needs to be sent immediately. If the message prioritization system 320 makes such a determination, it would follow the path to block 108. Messages in this category may typically be first tier messages, for example, messages about fraud. For all other messages, such as those further down in the ranking (e.g., 7 and higher), the message prioritization system 320 may determine that those messages are not urgent, and, therefore, do not need to be sent immediately. If the message prioritization system 320 determines that a message is not urgent, the message prioritization system 320 would follow the path to block 110. The message prioritization system 320 may use a second machine learning model to make the determination whether each of the messages is urgent based on the ranking. Alternatively, the message prioritization system 320 may use the same machine learning model described with respect to block 104 and/or the determination step of block 106 above. The features of the machine learning model of block 106 may be the same features of the machine learning model of block 104 and are not repeated herein for brevity.

In block 108, the message prioritization system 320 may send the first message to the user device. Once the message prioritization system 320 determines that the first message is urgent and needs to be sent, the message prioritization system 320 may send the message to the user device through appropriate means for the type of message used. This operation may be part of the message prioritization system 320 or may be a separate system, such as an outbound message dispatcher. The outbound message dispatcher may be operated on the same hardware as message prioritization system 320 or separate hardware, which may be operated by a $3^{rd}$ party.

In some embodiments, the message prioritization system 320 may send the first message to the user on all available channels (e.g., email, SMS, push, text, application). In other embodiments, the message prioritization system 320 may determine one or more channels by which should send the first message. This may involve the use of a third machine learning model. The message prioritization system 320 may feed input data to a third machine learning such as user preferences, message data, application data, and timing data. From there, the third machine learning model may predict which channel the user is most likely to be using at the time of the message. For example, if the message is going out to the user at 1:30 PM on a weekday, it is likely that the user is at work, therefore, the message prioritization system 320 via the third machine learning model, may decide to send the message to the user's work email address. In other via a user account indicating on which channels the user would prefer to receive messages. Such user preferences may override the decisioning by the message prioritization system 320 via the third machine learning model, or other message prioritization system 320 settings. The third machine learning model may have similarities to the first machine learning model or other parts of message prioritization system 320 in terms of training and feedback mechanisms.

In block 110, the message prioritization system 320 may determine a set time for the first message to be sent. For messages that are determined by the message prioritization system 320 to not be urgent, the message prioritization system 320 may chose a set time at which to send the non-urgent messages. The set time may be specific to each message or may be specific to a group of messages. The set time may be based on a variety of factors. For example, the set time may depend on the type of message or what application the message was from (e.g., messages about shopping may be sent on Saturdays, when a user is more likely to be at a mall). The set time may also depend on known user preferences. For example, if the user is known to work at night, then the message priority system 320 may focus on sending the message at a time that the user would likely be awake and not in the middle of the day (e.g., 8 pm). The set time may also depend on regulations. For example, certain debt collection regulations require debt collection calls to be made between certain hours of the day in certain regions. The set time may also be determined by the user's engagement with a website or application (e.g., typically at a certain time of day), the time zone the user is current located in (e.g., the set time may change if the user is travelling to match the time zone of the user), and the history of the user (e.g., based on how quickly or when the user responds or takes action in response to previous messages in the past). The message prioritization system 320 may consider these and other factors when considering the set time.

The message prioritization system 320 may determine, via a fourth machine learning model, a set time. The fourth machine learning model may use input data of user preference, message data, application data, and timing data. From there, the message prioritization system 320 via the fourth machine learning model may determine the best time to send the message to the user. The best time to send the message may be the time when the user is most likely to be impacted by the message. For example, a message about savings accounts may be best presented to the user right after the user receives a bonus a work. The fourth machine learning model may have similarities to the first machine learning model in terms of training and feedback mechanisms.

In block 112, the message prioritization system 320 may send the first message to the user device at the set time. The message prioritization system 320 may send the first message to the user on all available channels, channels selected by the user, using a user device, in a user preferences, or may use an additional machine learning model similar to the third machine learning model to determine which channels to use as disclosed in block 108 and is not repeated herein for brevity.

Figure 2A:
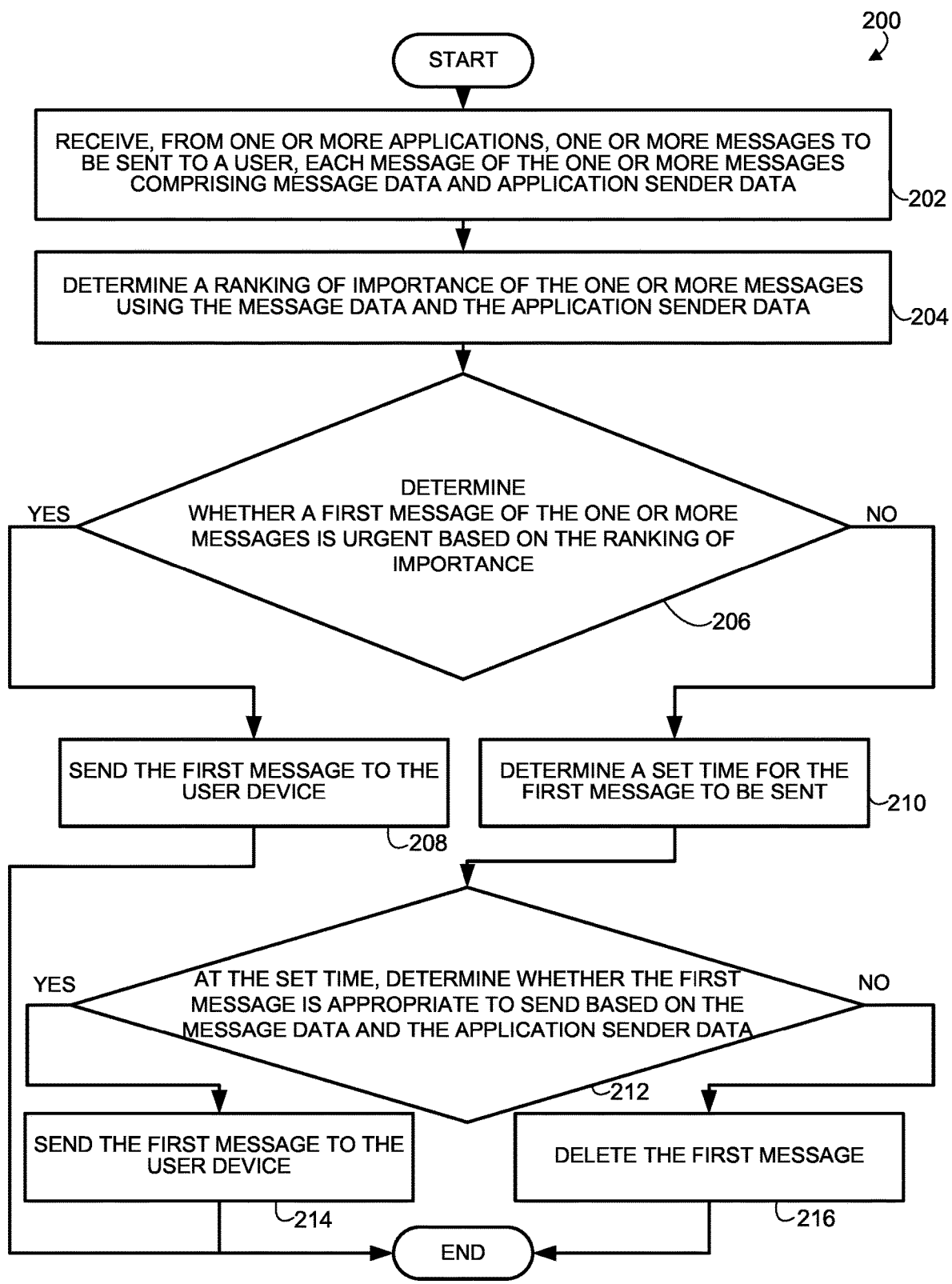
FIGS. 2A and 2B are a flow diagrams illustrating exemplary methods for prioritizing messages in accordance with certain embodiments of the disclosed technology.

FIG. 2A is a flow diagram illustrating an exemplary method 200 for prioritizing messages, in accordance with certain embodiments of the disclosed technology. The steps of method 200 may be performed by one or more components of the system 400 (e.g., message prioritization system 320 or web server 410 of user messaging system 408 or user device 402), as described in more detail with respect to FIGS. 3 and 4.

Method 200 of FIG. 2A is similar to method 100 of FIG. 1. Method 200 describes a system where messages that are not urgent may then queued to be sent at a later time. At the later time, the messages may then be analyzed and the system may then determine whether or not it is still relevant for the message to be sent, or if the message should be deleted. The descriptions of blocks 202, 204, 206, 208, and 210 in method 200 are similar to the respective descriptions of blocks 102, 104, 106, 108, and 110 of method 100 and are not repeated herein for brevity. However, block 212 is different from block 112 and is described below. Additional blocks 214 and 216 are also described below.

In block 212, the message prioritization system 320 may determine whether the first message is appropriate to send based on the message data and the application sender data. This may occur at the set time, or at a different time. This block serves as a verification to see if the set time chosen in block 210 was a good option. For example, the message prioritization system 320 may receive an advertising message based on a user device location (e.g., a store specific advertisement while a user is shopping in a store). If the set time for the message to be sent, as determined in step 210, happens to be after the user device has left the store (as determined by message prioritization system 320 in block 212), then there would be little reason to send the user a message regarding an in-store offer after the user has already left. Accordingly, the message prioritization system 320 may use the message data and the application sender data to determine if the message is appropriate to be sent at the set time. The message prioritization system 320 may also use additional data provided (e.g., user device location data in the example above).

The message prioritization system 320 may make the determination in block 212 with the aid of a fifth machine learning model. The fifth machine learning model may use input data of user preference, message data, application data, timing data, and other data. From there, the message prioritization system 320 via the fifth machine learning model may determine if it is appropriate to send the message to the user. The message prioritization system 320 may determine appropriateness based on relevance (e.g., the user has returned an item that an advertisement was about), timeframes (e.g., reminders that needed to take place within a certain amount of time that no longer matter), regulations (e.g., regulations governing when certain messages may be sent), or numerical thresholds (e.g., if a threshold number of messages have been sent to the user within a threshold amount of time). The fifth machine learning model may have similarities to the first machine learning model and/or other aspects of message prioritization system 320 in terms of training and feedback mechanisms. Block 212 potentially may also occur concurrently and/or in conjunction with block 210.

In block 214, if the message is appropriate to send, the message prioritization system 320 may send the first message to the user device. This may be similar to the description of block 208 and is not repeated herein for brevity.

In block 216, the message prioritization system 320 may delete the first message. If message prioritization system 320 determines in block 212 that the message is no longer relevant to the user (e.g., it would no longer make sense to send the message to the user), the system may delete the first message. This eliminates the possibility that the user would receive a message that was not pertinent. Over time, receiving inappropriate messages may cause users to discount or ignore future, relevant messages. This is a solution to that problem.

Figure 2B:
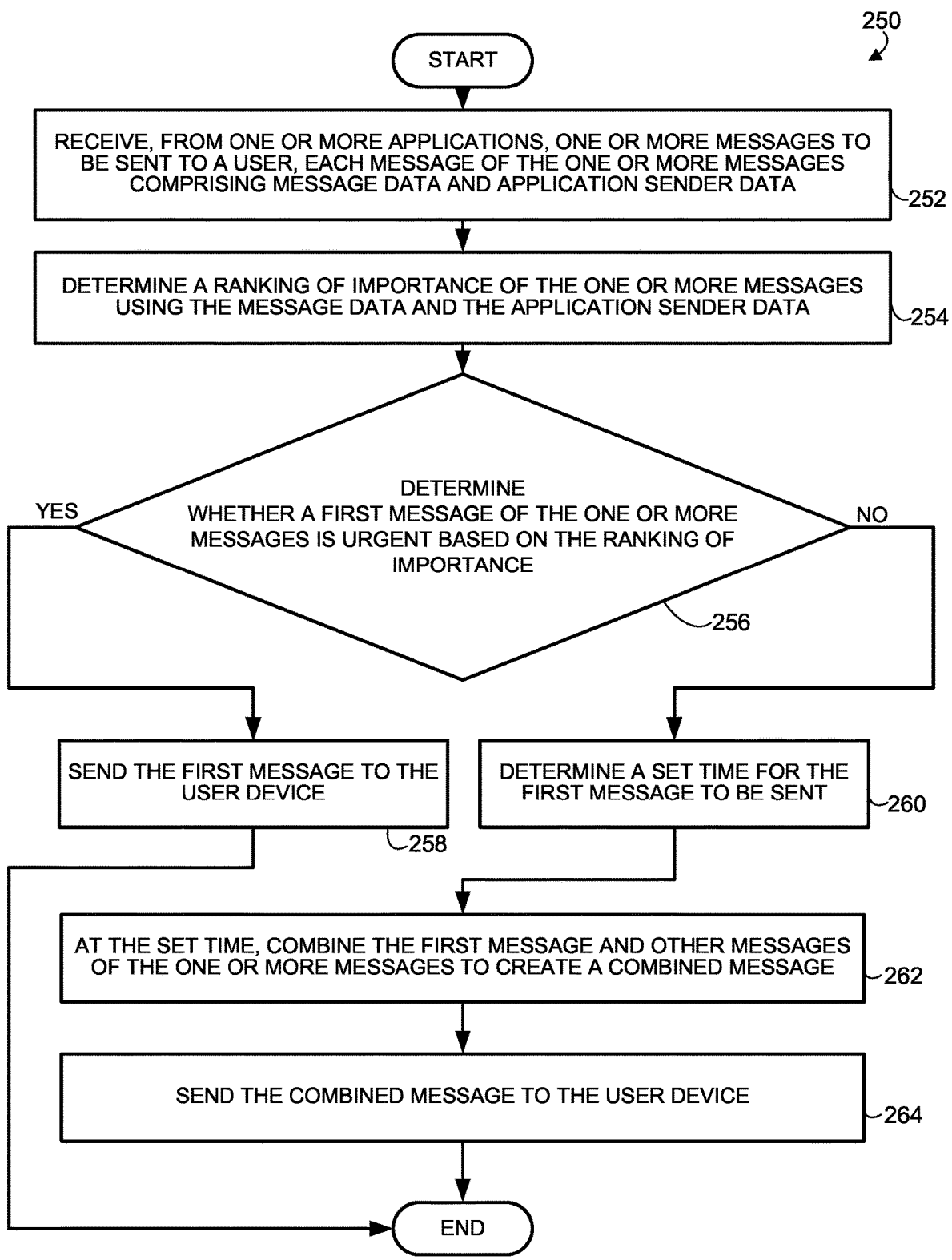

FIG. 2B is a flow diagram illustrating an exemplary method 250 for prioritizing messages, in accordance with certain embodiments of the disclosed technology. The steps of method 250 may be performed by one or more components of the system 400 (e.g., message prioritization system 320 or web server 410 of user messaging system 408 or user device 402), as described in more detail with respect to FIGS. 3 and 4.

Method 250 of FIG. 2B is similar to method 100 of FIG. 1. Method 250 allows queued messages to be combined. The descriptions of blocks 252, 254, 256, 258, and 260 in method 250 are similar to the respective descriptions of blocks 102, 104, 106, 108, and 110 of method 100 and are not repeated herein for brevity. However, block 262 is different from block 112 and is described below. Additional block 264 is also described below.

In block 262, the message prioritization system 320 may combine the first message and other messages of the one or more messages to create a combined message. Such a combination may occur at a set time as determined in block 260. The set time may be the set time for the first message. The set time may be a compromised set time based on multiple of the one or more messages (e.g., an average of set times). The set time may be based on user preferences. The message prioritization 320 may generate a combined with the aid of a sixth machine learning model. The sixth machine learning model may use input data of user preference, message data, application data, and timing data. The sixth machine learning model may have similarities to the first machine learning model and/or other aspects of message prioritization system 320 in terms of training and feedback mechanisms. The output combined message may be in the form of an email, text message, instant message, or any other type of conventional message as described above. The language contained in the combined message may be condensed or summarized. The condensed or summarized messages may be completed using hardcoded rules and/or templates or by using natural language processing models. The system may also determine, via the sixth machine learning model, the sequence of the individual messages (or the summaries of the individual messages) within the combined message. The order of the messages within the combined message may be based on the ranking of importance.

In block 264, the message prioritization system 320 may send the combined message to the user device. This may generally follow the description of block 208 and is not repeated herein for brevity. The combined message may be generated and transmitted to a user device as an interactive graphical user interface. The user may be able to interact with the combined message graphical user interface as part of a mobile application on a user device 402. The user may be able to tap or interact with an individual piece (e.g., a snippet) of the combined message to view the entire original message. The user may also be able to select user preferences on the user device 402 which may be used throughout message prioritization system 320 (e.g., text messages preferred over email, no messages after 10 pm except fraud).

Figure 3:
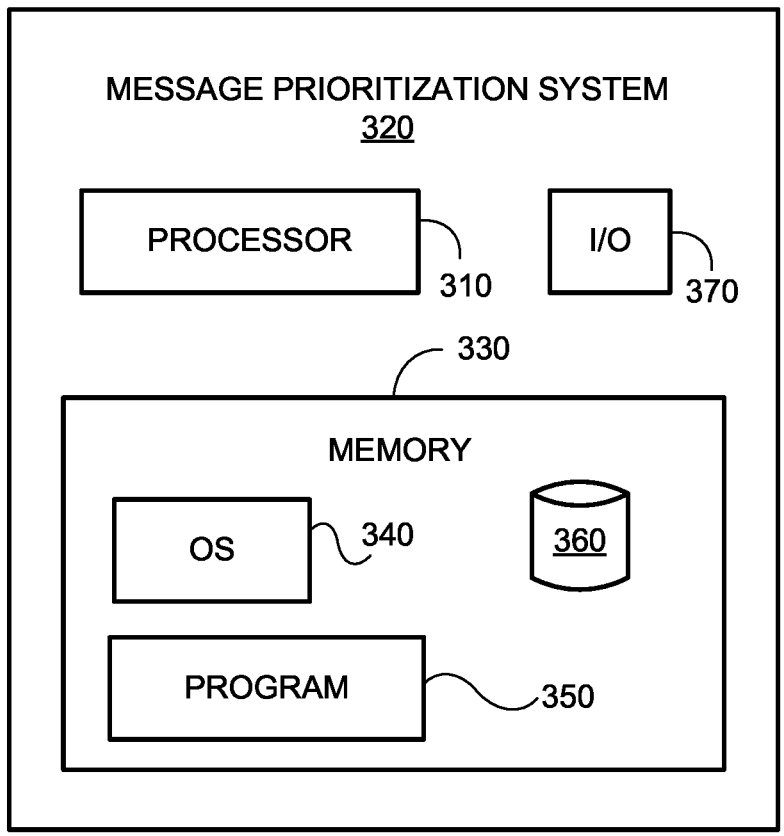
FIG. 3 is a block diagram of an example message prioritization system used to provide prioritizing messages, according to an example implementation of the disclosed technology.
Figure 4:
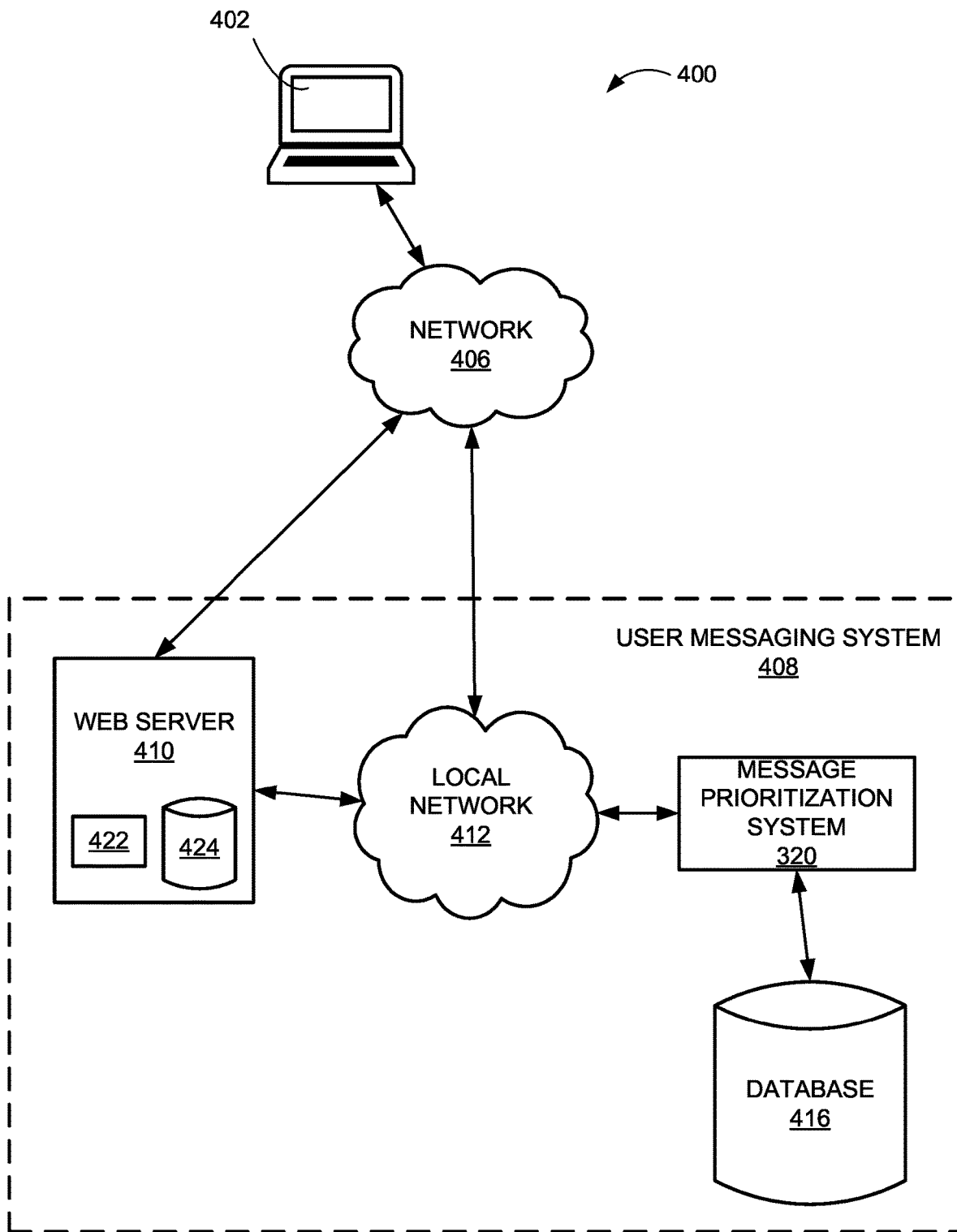
FIG. 4 is a block diagram of an example system that may be used to provide prioritizing messages, according to an example implementation of the disclosed technology.

FIG. 3 is a block diagram of an example message prioritization system 320 used to prioritize messages to be sent to a user according to an example implementation of the disclosed technology. According to some embodiments, the user device 402 and web server 410, as depicted in FIG. 4 and described below, may have a similar structure and components that are similar to those described with respect to message prioritization system 320 shown in FIG. 3. As shown, the message prioritization system 320 may include a processor 310, an input/output (I/O) device 370, a memory 330 containing an operating system (OS) 340 and a program 350. In certain example implementations, the message prioritization system 320 may be a single server or may be configured as a distributed computer system including multiple servers or computers that interoperate to perform one or more of the processes and functionalities associated with the disclosed embodiments. In some embodiments message prioritization system 320 may be one or more servers from a serverless or scaling server system. In some embodiments, the message prioritization system 320 may further include a peripheral interface, a transceiver, a mobile network interface in communication with the processor 310, a bus configured to facilitate communication between the various components of the message prioritization system 320, and a power source configured to power one or more components of the message prioritization system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the message prioritization system 320 may include one or more storage devices configured to store information used by the processor 310 (or other components) to perform certain functions related to the disclosed embodiments. In one example, the message prioritization system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The message prioritization system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the message prioritization system 320 may include the memory 330 that may include one or more programs 350 to perform one or more functions of the disclosed embodiments. For example, in some embodiments, the message prioritization system 320 may additionally manage dialogue and/or other interactions with the customer via a program 350.

The processor 310 may execute one or more programs 350 located remotely from the message prioritization system 320. For example, the message prioritization system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a message prioritization system database 360 for storing related data to enable the message prioritization system 320 to perform one or more of the processes and functionalities associated with the disclosed embodiments.

The message prioritization system database 360 may include stored data relating to status data (e.g., average session duration data, location data, idle time between sessions, and/or average idle time between sessions) and historical status data. According to some embodiments, the functions provided by the message prioritization system database 360 may also be provided by a database that is external to the message prioritization system 320, such as the database 416 as shown in FIG. 4.

The message prioritization system 320 may also be communicatively connected to one or more memory devices (e.g., databases) locally or through a network. The remote memory devices may be configured to store information and may be accessed and/or managed by the message prioritization system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The message prioritization system 320 may also include one or more I/O devices 370 that may comprise one or more interfaces for receiving signals or input from devices and providing signals or output to one or more devices that allow data to be received and/or transmitted by the message prioritization system 320. For example, the message prioritization system 320 may include interface components, which may provide interfaces to one or more input devices, such as one or more keyboards, mouse devices, touch screens, track pads, trackballs, scroll wheels, digital cameras, microphones, sensors, and the like, that enable the message prioritization system 320 to receive data from a user (such as, for example, via the user device 402).

In examples of the disclosed technology, the message prioritization system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The message prioritization system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The message prioritization system 320 may be configured to adjust model parameters during training. Model parameters may include weights, coefficients, offsets, or the like. Training may be supervised or unsupervised.

The message prioritization system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The message prioritization system 320 may be configured to optimize statistical models using known optimization techniques.

The message prioritization system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the message prioritization system may analyze information applying machine-learning methods.

While the message prioritization system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the message prioritization system 320 may include a greater or lesser number of components than those illustrated.

FIG. 4 is a block diagram of an example system that may be used to view and interact with user messaging system 408, according to an example implementation of the disclosed technology. The components and arrangements shown in FIG. 4 are not intended to limit the disclosed embodiments as the components used to implement the disclosed processes and features may vary. As shown, user messaging system 408 may interact with a user device 402 via a network 406. In certain example implementations, the user messaging system 408 may include a local network 412, a message prioritization system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the user messaging system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the user messaging system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The user messaging system 408 may be associated with and optionally controlled by one or more entities such as a business, corporation, individual, partnership, or any other entity that provides one or more of goods, services, and consultations to individuals such as customers. In some embodiments, the user messaging system 408 may be controlled by a third party on behalf of another business, corporation, individual, partnership. The user messaging system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the message prioritization system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the user messaging system 408 to interact with one another and to connect to the network 406 for interacting with components in the system 400 environment. In some embodiments, the local network 412 may include an interface for communicating with or linking to the network 406. In other embodiments, certain components of the user messaging system 408 may communicate via the network 406, without a separate local network 406.

The user messaging system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access user messaging system 408 using the cloud computing environment. User device 402 may be able to access user messaging system 408 using specialized software. The cloud computing environment may eliminate the need to install specialized software on user device 402.

In accordance with certain example implementations of the disclosed technology, the user messaging system 408 may include one or more computer systems configured to compile data from a plurality of sources the message prioritization system 320, web server 410, and/or the database 416. The message prioritization system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Although the preceding description describes various functions of a web server 410, a message prioritization system 320, and a database 416, in some embodiments, some or all of these functions may be carried out by a single computing device.

Example Use Case

The following example use case describes an example of a typical user flow pattern. This section is intended solely for explanatory purposes and not in limitation.

In one example based on FIG. 1, Celeste is travelling to Greece. Once Celeste arrives in Greece she uses her credit card to buy $105 of food at a local grocery store at 3:05 PM. The message prioritization system 320 receives three messages due to this transaction from three separate server-side banking applications (block 102). Message A is a notification message that Celeste set-up using her user preferences that sends a message to her phone for any charge over $50. Message B is a marketing message about currency exchange information between the Euro and the U.S. Dollar. Message C is a fraud warning message notifying Celeste that her card was used in an unexpected transaction in Greece. The message prioritization system 320 determines a ranking of importance for the three messages as follows (block 104): Because message C is sent from a fraud application and the application is a fraud warning, it is ranked first (e.g., the highest rank). Because message A is a user-selected message, it is ranked second. Because message B is a marketing message, it is ranked third. Next, since the first message (message C) is related to fraud, the message prioritization system 320 determines that the message is urgent (block 106). Therefore, the message prioritization system 320 sends the first message to the Celeste's phone (block 108) immediately (3:06 PM).

At block 106, the second and third messages (messages A and B respectively) are both determined to be not urgent because the message A is an opt-in message and message B is a marketing message. Accordingly, the message prioritization system 320 determines that message A should be sent in 1 hour (4:06 PM) as that time would still be relevant, but not intrusive (block 110). At 4:06 PM, message prioritization system 320 sends message A to Celeste's phone (block 112). Message prioritization system 320 determines that message B should be sent at 8:00 PM as it is likely, based on the supplied location data, that Celeste is on a trip to Greece and the information in the marketing message would still be relevant at a later time, and Celeste's user preferences restrict messages 8:30 PM. (block 110). At 8:00 PM, message prioritization system 320 sends message B to Celeste's phone (block 112).

In an alternative version of the above example based on FIG. 2A, the message prioritization system 320 determines that message A is an opt-in message and is superfluous given that the fraud message already contains similar information about the charge at the set time (block 212). Therefore, message prioritization system 320 deletes the first message (block 216). The message prioritization system 320 determines that message B is still appropriate to send at 8:00 PM, given that Celeste is still in Greece, based on her phone's location data. Therefore, the message prioritization system 320 sends message B to Celeste's phone at 8:00 PM.

In an alternative version of the above example based on FIG. 2B, the message prioritization system 320 determines that message A should be sent in 1 hour (4:06 PM) as that time would still be relevant, but not intrusive) (block 260). The message prioritization system 320 combines message A and message B to create a combined message (block 262) at 4:06 PM and then sends the combined message to Celeste's phone (block 264). Celeste can then open and view the messages individually on an interactive graphical user interface from the combined message.

In some examples, disclosed systems or methods may involve one or more of the following clauses:

Clause 1: A message prioritization system comprising: one or more processors; memory in communication with the one or more processors and storing instructions that are configured to cause the message prioritization system to: receive, from one or more applications, one or more messages to be sent to a user, each message of the one or more messages comprising message data and application sender data; determine a ranking of importance of the one or more messages using the message data and the application sender data; determine, using a first machine learning model, whether a first message of the one or more messages is urgent based on the ranking of importance; responsive to determining the first message is urgent: send the first message to the user device; responsive to determining the first message is not urgent: determine a set time for the first message to be sent; and send the first message to the user device at the set time.

Clause 2: The message prioritization system of clause 1, wherein determining the ranking of importance of the one or more messages utilizes a second machine learning model.

Clause 3: The message prioritization system of clause 2, wherein the second machine learning model is trained based on data from other users, recognizing messages that are known to occur in conjunction with other messages, known user preferences for each user, or combinations thereof.

Clause 4: The message prioritization system of clause 1, wherein: the application sender data comprises timing data, application information about the one or more applications sending the one or more messages, or both, and determining the ranking of importance is based on the timing data, the application information, or both.

Clause 5: The message prioritization system of clause 1, wherein the memory stores further instructions that are configured to cause the message prioritization system to: generate a first graphical user interface indicating for the user to select preferences regarding messages; transmit the first graphical user interface to the user device for display; receive user preferences from the user device; and wherein the first machine learning model determines the ranking of importance based on the user preferences.

Clause 6: The message prioritization system of clause 1, wherein security messages are highest on the ranking of importance.

Clause 7: The message prioritization system of clause 1, wherein the ranking of importance is determined dynamically.

Clause 8: The message prioritization system of clause 1, wherein the system determines the ranking of importance using a tiered rules-based approach.

Clause 9: The message prioritization system of clause 1, wherein the memory stores further instructions that are configured to cause the message prioritization system to: determine, using a third machine learning model, one or more channels for sending the first message; and send the first message via the one or more channels.

Clause 10: The message prioritization system of clause 9, wherein the one or more channels comprise SMS, push notifications, email, or combinations thereof.

Clause 11: The message prioritization system of clause 9, wherein the system uses the third machine learning model to categorize the first message based on feedback from prior messages opened by the user.

Clause 12: A message prioritization system comprising: one or more processors; memory in communication with the one or more processors and storing instructions that are configured to cause the message prioritization system to: receive, from one or more applications, one or more messages to be sent to a user, each message of the one or more messages comprising message data and application sender data; determine a ranking of importance of the one or more messages using the message data and the application sender data; determine, using a first machine learning model, whether a first message of the one or more messages is urgent based on the ranking of importance; responsive to determining the first message is urgent: send the first message to a user device; responsive to determining the first message is not urgent: determine a set time for the first message to be sent; and at the set time, determine, using a second machine learning model whether the first message is appropriate to send based on the message data and the application sender data; responsive to determining that the first message is appropriate to send: send the first message to the user device; and responsive to determining that the first message is not appropriate to send: delete the first message.

Clause 13: The message prioritization system of clause 12, wherein: the application sender data comprises timing data, application information about the one or more applications sending the one or more messages, or both, and determining whether the first message is appropriate to send is based on whether an appropriate timeframe for the first message to be sent has passed.

Clause 14: The message prioritization system of clause 12, wherein determining whether the first message is appropriate to send is based on regulations that govern when the first message may be sent.

Clause 15: The message prioritization system of clause 12, wherein: determining the ranking of importance of the one or more messages utilizes a third machine learning model, and determining the ranking of importance is based on how much time has passed since the one or more messages were sent from the one or more applications.

Clause 16: The message prioritization system of clause 12, determining whether the first message is appropriate to send is based on a threshold number of messages that have been sent to the user within a threshold amount of time.

Clause 17: A message prioritization system comprising: one or more processors; memory in communication with the one or more processors and storing instructions that are configured to cause the message prioritization system to: receive, from one or more applications, one or more messages to be sent to a user, each message of the one or more messages comprising message data and application sender data; determine a ranking of importance of the one or more messages using the message data and the application sender data; determine, using a first machine learning model, whether a first message of the one or more messages is urgent based on the ranking of importance; responsive to determining the first message is urgent: send the first message to the user device; responsive to determining the first message is not urgent: determine a set time for the first message to be sent; at the set time, combine, using a second machine learning model, the first message and other messages of the one or more messages to create a combined message; and send the combined message to the user device.

Clause 18: The message prioritization system of clause 17, wherein the memory stores further instructions that are configured to cause the message prioritization system to: generate a first graphical user interface containing the combined message, wherein the first message and the other messages are presented on the first graphical user interface in an order of the ranking of importance; and transmit the first graphical user interface to the user device for display.

Clause 19: The message prioritization system of clause 18, wherein the first graphical user interface is part of a mobile application on the user device.

Clause 20: The message prioritization system of clause 17, wherein the combined message is an email.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving one or more messages to be sent to a user;
   determining a ranking of importance of the one or more messages;
   determining, using a first machine learning model, whether a first message of the one or more messages is urgent based on the ranking of importance;
   responsive to determining the first message is urgent:
      sending the first message to a user device;
   responsive to determining the first message is not urgent:
      determining a set time for the first message to be sent;
      at the set time, determining, using a second machine learning model, whether the first message is appropriate to send; and responsive to determining that the first message is appropriate to send;
sending the first message to the user device.

2. The method of claim 1, wherein determining the ranking of importance of the one or more messages utilizes a third machine learning model.

3. The method of claim 2, wherein the third machine learning model is trained based on data from other users, recognizing messages that are known to occur in conjunction with other messages, known user preferences for each user, or combinations thereof.

4. The method of claim 1, wherein:
each message of the one or more messages comprises application sender data,
the application sender data comprises timing data, application information about one or more applications sending the one or more messages, or both, and
determining the ranking of importance is based on the timing data, the application information, or both.

5. The method of claim 1, further comprising:
generating a first graphical user interface indicating for the user to select preferences regarding messages;
transmitting the first graphical user interface to the user device for display;
receiving user preferences from the user device; and
wherein the first machine learning model determines the ranking of importance based on the user preferences.

6. The method of claim 1, wherein security messages are highest on the ranking of importance.

7. The method of claim 1, wherein the ranking of importance is determined dynamically.

8. The method of claim 1, wherein:
the ranking of importance is determined using a tiered rules-based approach, and
the method further comprises:
at the set time, combining, using a third machine learning model, the first message and other messages of the one or more messages to create a combined message; and
sending the combined message to the user device at the set time.

9. The method of claim 1, further comprising:
determining, using a fourth machine learning model, one or more channels for sending the first message; and
sending the first message via the one or more channels.

10. The method of claim 9, wherein:
the one or more channels comprise SMS, push notifications, email, or combinations thereof.

11. The method of claim 9, wherein the fourth machine learning model categorizes the first message based on feedback from prior messages opened by the user.

12. A non-transitory computer readable medium storing program instructions that when executed by one or more processors cause a device to perform the steps of:
receiving one or more messages to be sent to a user;
determining a ranking of importance of the one or more messages;
determining, using a first machine learning model, whether a first message of the one or more messages is urgent based on the ranking of importance;
responsive to determining the first message is urgent: sending the first message to a user device;
responsive to determining the first message is not urgent: determining a set time for the first message to be sent; and
at the set time, determining, using a second machine learning model, whether the first message is appropriate to send; and
responsive to determining that the first message is appropriate to send:
sending the first message to the user device.

13. The non-transitory computer readable medium of claim 12, wherein:
each message of the one or more messages comprises application sender data,
the application sender data comprises timing data, application information about one or more applications sending the one or more messages, or both,
determining whether the first message is appropriate to send is based on whether an appropriate timeframe for the first message to be sent has passed, and
responsive to determining that the first message is not appropriate to send: deleting the first message.

14. The non-transitory computer readable medium of claim 12, wherein determining whether the first message is appropriate to send is based on regulations that govern when the first message may be sent.

15. The non-transitory computer readable medium of claim 12, wherein:
determining the ranking of importance of the one or more messages utilizes a third machine learning model, and
determining the ranking of importance is based on how much time has passed since the one or more messages were sent from one or more applications.

16. The non-transitory computer readable medium of claim 12, determining whether the first message is appropriate to send is based on a threshold number of messages that have been sent to the user within a threshold amount of time.

17. A system comprising:
one or more processors;
memory in communication with the one or more processors and storing instructions that are configured to cause the system to:
receive one or more messages;
determine a ranking of importance of the one or more messages;
determine whether a first message of the one or more messages is urgent based on the ranking of importance;
responsive to determining the first message is urgent: send the first message to a user device;
responsive to determining the first message is not urgent:
determine a set time for the first message to be sent; and
at the set time, determine, using a first machine learning model, whether the first message is appropriate to send; and
responsive to determining that the first message is appropriate to send;
send the first message to the user device.

18. The system of claim 17, wherein the memory stores further instructions that are configured to cause the system to:
at the set time, combine, using a second machine learning model, the first message and other messages of the one or more messages to create a combined message;
generate a first graphical user interface containing the combined message, wherein the first message and the other messages are presented on the first graphical user interface in an order of the ranking of importance; and transmit the first graphical user interface to the user device for display.

19. The system of claim 18, wherein the first graphical user interface is part of a mobile application on the user device.

20. The system of claim 18, wherein the combined message is an email.

\* \* \* \* \*